June 30, 1970   S. E. KEAGLE   3,517,607
AUTOMATIC ARTICLE CRUSHING APPARATUS
Filed Sept. 18, 1967   4 Sheets-Sheet 1

INVENTOR.
STANLEY E. KEAGLE
BY
Burd, MacEachron, Braddock,
Bartz & Schwartz
ATTORNEYS

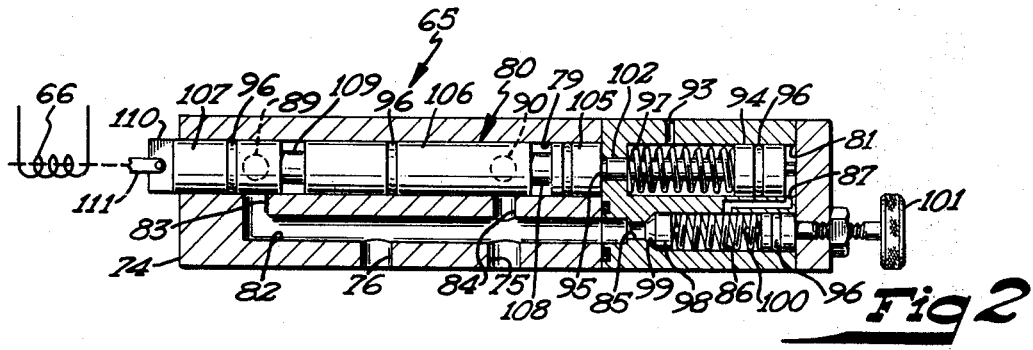
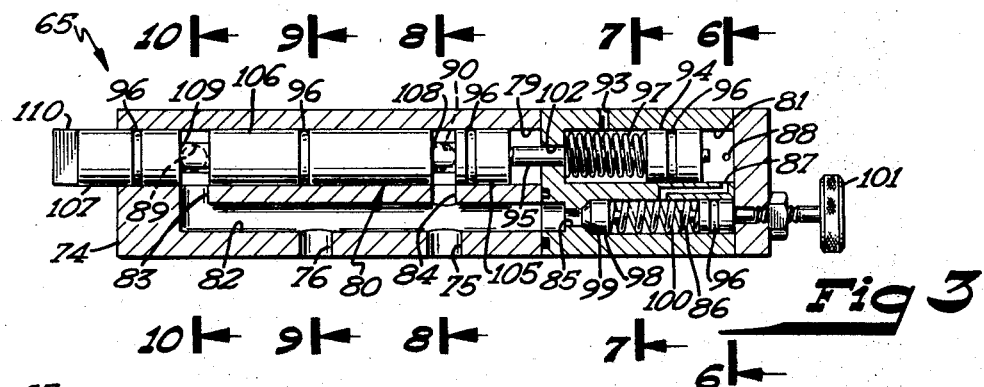
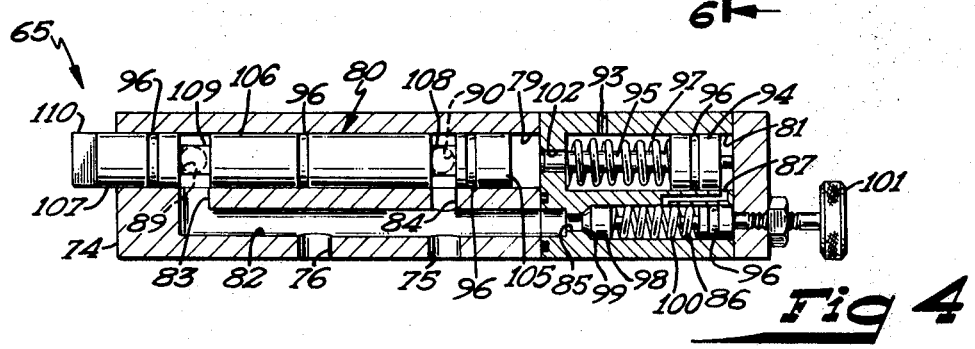
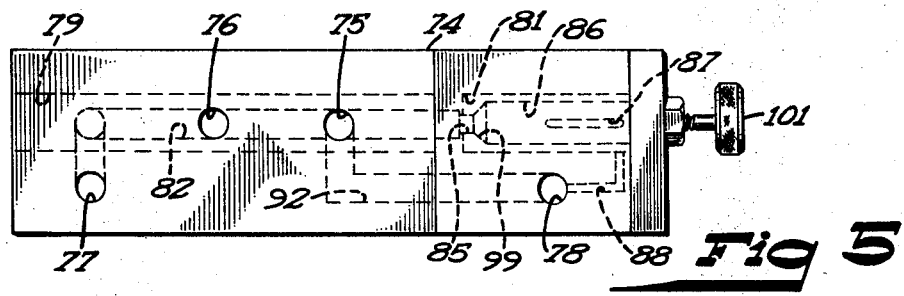

INVENTOR.
STANLEY E. KEAGLE
BY Burd, MacEachron, Braddock
Bartz & Schwartz
ATTORNEYS INVENTOR.
STANLEY E. KEAGLE
BY
Burd, MacEachron, Braddock,
Bartz & Schwartz
ATTORNEYS

United States Patent Office 3,517,607
Patented June 30, 1970

3,517,607
AUTOMATIC ARTICLE CRUSHING APPARATUS
Stanley E. Keagle, Sarasota, Fla., assignor to Earll Manufacturing Company, Minneapolis, Minn., a corporation of Minnesota
Filed Sept. 18, 1967, Ser. No. 668,431
Int. Cl. B30b 15/14
U.S. Cl. 100—49          14 Claims

ABSTRACT OF THE DISCLOSURE

A fully automatic bottle and can crusher in which articles are fed, one at a time, into the crusher by a feeder. The feeder control is responsive to the presence of an article in the feeder, and the crusher control is responsive to the presence of an article in the crusher. The crusher is operated by an electrically actuated hydraulic valve which discontinues operation of the crusher at a predetermined hydraulic pressure.

BACKGROUND OF THE INVENTION

This invention relates to article crushing apparatus and control means therefor; and, more particularly, to automatic can and bottle crushers.

Bottle crushers are well known and have previously been operated by insertion of the article to be crushed accompanied by manual starting of the crushing mechanism. Such devices are unsatisfactory because they require constant operator attention and are inefficient when the volume of material to be crushed is large. Other prior art devices have added means for automatically actuating the crusher when an article to be crushed is present. This improvement leaves the crusher in a standby position until an article is inserted into the machine, whereupon the crusher operates and disposes of the article. These machines have suffered the drawback that if several articles of varying sizes are inserted, they may cause feeding problems in the crusher. Further attempts to automate crushers have resulted in development of article feeders which supply one article at a time to the crusher. Addition of the single can feed did not entirely solve the problem because the resulting apparatus was still not fully automatic.

SUMMARY OF THE INVENTION

This invention provides a fully automatic article crusher having an article feeder which operates only when an article to be crushed is present in the feeder. The feeder then feeds the articles, one at a time, into the crusher which is controlled so as to operate only when an article is present in the crusher. The entire crushing apparatus is in a standby condition until an article to be crushed is dropped into the feed line. So long as the feed line contains articles, the device operates continuously but it automatically returns to the standby position as soon as the feed line is emptied.

The crusher itself is controlled by an electrically actuated hydraulic spool valve. An article sliding into the crusher actuates the electrical mechanism which moves the valve to a pressure position so that the crushing means crushes the article until a predetermined hydraulic pressure level is reached. The valve is so designed that upon reaching the predetermined pressure level, the spool is actuated to a drain position and the crusher returns to its standby state ready to be actuated by the next article.

Further features and advantages of the invention will be readily apparent from consideration of the following detailed description of the drawings and the preferred embodiment.

BRIEF DESCRIPTION OF THE DRAWINGS

FIG. 2 is a cross-sectional side view of one form of hydraulic control valve for use in the apparatus, the valve being in a pressure position;
FIG. 3 is a cross-sectional view of the valve of FIG. 2 in a drain position;
FIG. 4 is a cross-sectional side view of the valve of FIG. 2 in a standby position;
FIG. 5 is a bottom view of the valve of FIGS. 2–4.

DESCRIPTION OF THE PREFERRED EMBODIMENT

Crusher structure

Figure 1:
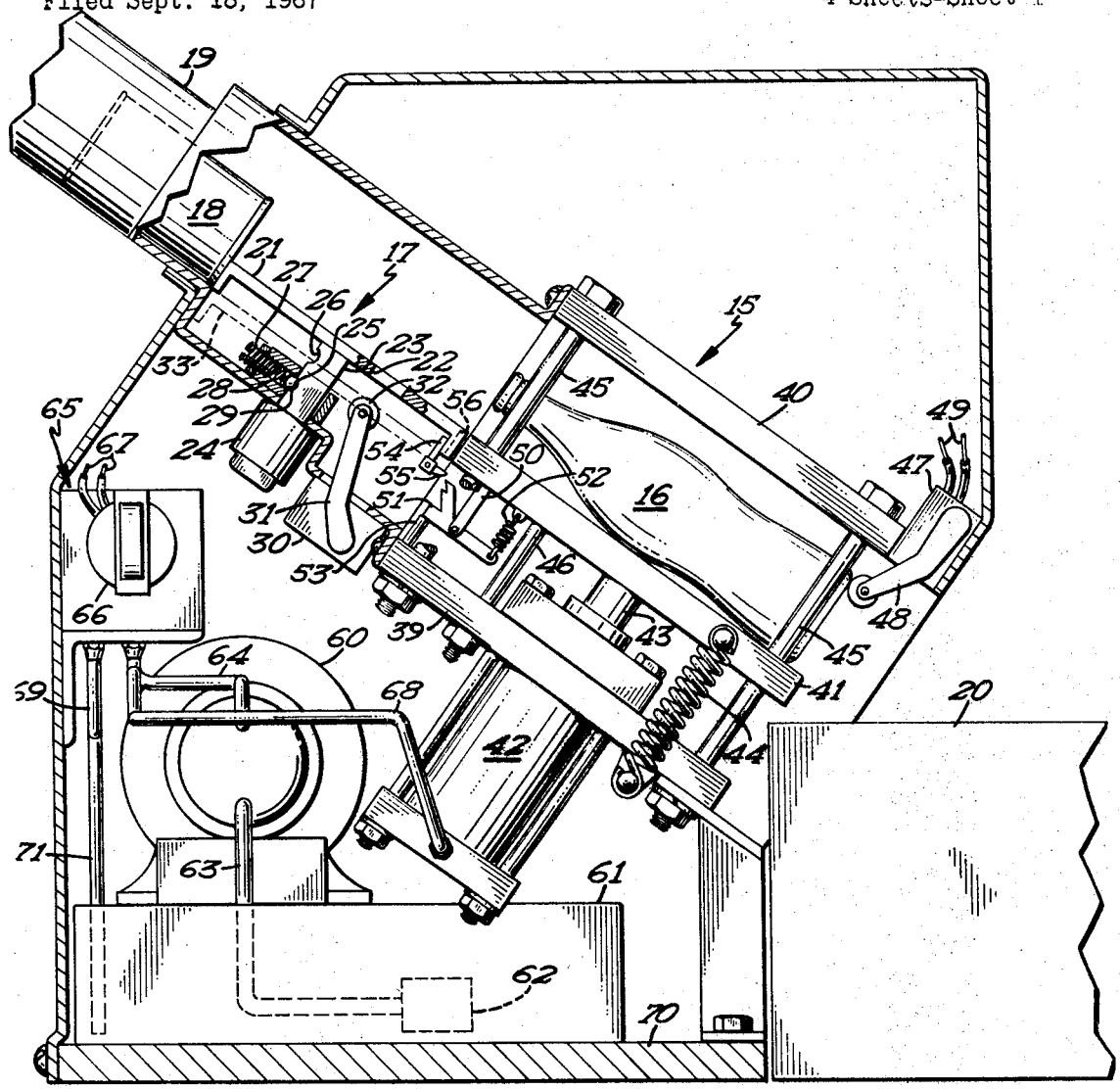
FIG. 1 is a side view, partially cut away, of the crushing apparatus of the invention.

The crushing apparatus is shown in FIG. 1. The article crushing means is here shown as a hydraulic crusher, generally designated 15, containing a bottle 16 to be crushed. Feeding means, generally designated 17, is positioned adjacent crusher 15, and is adapted to feed articles to be crushed into crusher 15 one at a time. A can 18 is disposed in a flexible chute 19 leading to feeding means 17 so that the lower edge of can 18 abuts a portion of feeding means 17. Chute 19 extends upwardly to a mouth, not shown, which may be mounted in the back portion of a bar or other place from which cans and bottles must be sent for disposal. Cans and bottles to be disposed of are dropped into the mouth of chute 19 and slide downward to the position of can 18. The crushing apparatus also includes a refuse container 20 which collects the broken and crushed pieces of bottles and cans. Container 20 is removable from the crushing apparatus for disposal of the crushed material.

Feeding means 17 includes an elevator platform 21 containing an elongated aperture 22 therethrough and downwardly extending end portions, one of which includes a vertical slot 56. Platform 21 is connected to a support post 23 which cooperates with a solenoid elevator operator 24. Support 23 includes a pair of hemispherical depressions 25 and 26 which cooperate with an adjusting screw 27, a bias spring 28 and a ball 29 to form a detent mechanism for retaining platform 21 in either a raised or lowered position.

The control means for feeding means 17 includes switching means, here shown as a micro-switch 30 of standard construction, having a switch operator arm 31 extending upwardly and terminating in a roller 32 positioned so that it extends through aperture 22 when platform 21 is in a lower position 33, which is shown in dotted lines. Switch 30 is connected to a source of power not shown, and further connected in controlling relationship to solenoid 24. Depression of switch arm 31 closes a circuit which energizes solenoid 24 thereby raising platform 21 from lower position 33 to the upper position shown in FIG. 1 (solid lines).

Crusher 15 includes a lower stationary platen 39 which is rigidly connected to an upper stationary platen 40. Disposed between platens 39 and 40 is a movable platen 41. A hydraulic cylinder 42 is rigidly mounted to lower platen 39 and contains a hydraulic ram 43 which has its upper end attached to the underside of movable platen 41. Movable platen 41 is driven upward toward upper stationary platen 40 by hydraulic cylinder 43 during the crushing operation. Platen 41 is returned to its original position after the crushing operation by reset means, here shown as a return spring 44. A plurality of guide bolts 45 connect upper platen 40 to lower platen 39 in a predetermined, fixed, spaced relation. Movable platen 41 contains a plurality of guide holes through which guide bolts 45 are disposed to form guide means therefor as it moves up and down in the crushing operation. A stop member 46 is provided so that movable platen 41 returns to the same lower position after each crushing operation.

The control means for crusher 15 includes a switch 47, which may conveniently be a conventional microswitch, having an actuating arm 48 extending downwardly therefrom so that the lower end of arm 48 is disposed in the space between upper platen 40 and movable platen 41 when movable platen 41 is in the lower position. Electrically conductive leads 49 extend from switch 47 to a source of power, not shown, and to a solenoid 66 which controls a hydraulic valve, generally designated 65, so that actuation of switch 47 controls operation of solenoid 66.

Also included in the crushing apparatus is means for resetting feeding means 17 to position 33 while movable platen 41 is being reset to its lower position. This reset mechanism for feeding means 17 includes a latch bracket 50 which extends downwardly from movable platen 41. Rotatably attached to latch bracket 50 is a latch member 51. Attached to one end of latch member 51 is a latch bias spring 52 whose other end is attached to the lower side of movable platen 41. When movable platen 41 is in the position shown in FIG. 1, latch member 51 bears against a latch stop 53 which extends upwardly from stationary platen 39. A latch catch bracket 54 is rigidly attached to the depending end of elevator platform 21 adjacent crusher 15. Rotatably disposed in catch bracket 54 is a latch catch 55; and immediately above latch catch 55 is the groove 56 in the end of elevator platform 21.

The hydraulic system of the crushing apparatus includes a hydraulic pump 60 which is mounted on top of a hydraulic fluid reservoir 61. Pump 60 is driven electrically from a source of power, not shown, and is turned on and off from a master switch, also not shown, which also controls the power to switches 30 and 47 and to solenoids 24 and 66. Reservoir 61 contains a hydraulic fluid filter 62 which is connected to pump 60 by a pump intake line 63. From pump 60, a pressure supply line 64 extends upwardly to the hydraulic control valve 65, which is actuated by solenoid 66. A pair of leads 67 from solenoid 66 are connected to the source of power and to one of leads 49 of switch 47 by conductors, not shown. From valve 65, a ram supply and return line 68 extends to the bottom of cylinder 42. A pair of drain lines 69 and 71 extend downwardly from valve 65, joining into one line which empties into reservoir 61. The entire apparatus including crusher 15, feeding means 17, and the hydraulic system is mounted in a support structure 70, which supports the various portions and encloses the apparatus to prevent broken pieces of glass or other material from escaping from the crushing area.

OPERATION OF CRUSHING APPARATUS

Assume that the entire apparatus is empty of materials to be crushed. Elevator platform 21 will be in dotted position 33 and movable platen 41 will be in the lower position, as shown in FIG. 1. The first piece to be crushed is fed into the mouth of tube 19 and slides downward in tube 19 and across the top of elevator platform 21 (which is flush with the lower surface of tube 18) until it strikes the edge of movable platen 41 which is closest to elevator platform 21. The article is stopped by this leading edge of movable platen 41 and any articles behind it will be stopped by the upper end of the article to be crushed and the depending end of platform 21 as it rises. As the article slides over the upper surface of elevator platform 21, it strikes roller 32 depressing arm 31 and actuating switch 30. Actuation of switch 30 causes power to be supplied to solenoid 24 which then moves elevator platform 21 to the upper position as shown in FIG. 1. In the detenting mechanism, ball 29 is forced into depression 25 thereby retaining platform 21 in the upper position even though pressure has been removed from roller 32 so that it returns to its normal position opening switch 30 and removing power from solenoid 24.

While elevator platform 21 is in its upper position the depending edge of platform 21 adjacent tube 19 forms an abutment member which prevents further articles, such as can 18, from entering the feeding means while the previous article is being crushed.

When elevator platform 21 reaches its upper position, its upper surface is flush with the upper surface of movable platen 41 and the article to be crushed, such as bottle 16, slides downward onto platen 41. As the article reaches the opposite end of crusher 15, it engages arm 48 moving it and actuating switch 47. Switch 47, in turn, actuates solenoid 66 which actuates hydraulic valve 65 to a position wherein hydraulic fluid under pressure can be supplied through ram supply line 68 to hydraulic cylinder 42.

Hydraulic fluid is drawn from reservoir 61 through filter 62 and pump supply line 63 to hydraulic pump 60. Hydraulic fluid under pressure is supplied from pump 60 through pressure line 64 to valve 65 and through valve 65 to ram supply line 68. The hydraulic fluid causes ram 43 to be forced upward out of cylinder 42 thereby raising movable platen 41 upwardly along guide bolts 45 toward upper stationary platen 40. This upward motion of platen 41 crushes the articles until a predetermined hydraulic pressure is reached in cylinder 42 and valve 65. At that time, valve 65 is actuated to a position which removes supply pressure from the hydraulic fluid in cylinder 42 and provides a return channel through line 68 and valve 65 to drain line 69. Once the hydraulic pressure is removed from ram 43, return spring 44 draws movable platen 41 back down to the lower position abutting stop 46, thereby forcing the hydraulic fluid back through line 68, valve 65 and drain line 69 to reservoir 61.

The latching mechanisms provides a means for resetting elevator platform 21 to its lower position upon the return of movable platen 41 to its lower position. While movable platen 41 is in its lower position, latch member 51 is in a position with its leading edge retracted sufficiently to permit latch catch 55 to move upwardly past member 51 without engaging it. Latch catch 55 travels upwardly with elevator platform 21 as it rises to the solid position.

Catch member 55 is attached to bracket 54 in such a manner that it is rotatable from the position shown in FIG. 1 to a position in which the pointed edge of catch member 55 is vertically upward, but catch 55 is either biased or constructed so that as soon as the pressure rotating it upwardly is removed, catch 55 drops back to the position shown in FIG. 1 where it stops. Thus, catch member 55 is rotatable through an angle of approximately 90° and, in the absence of pressure from below, is in the position shown in FIG. 1.

Figure 1A:
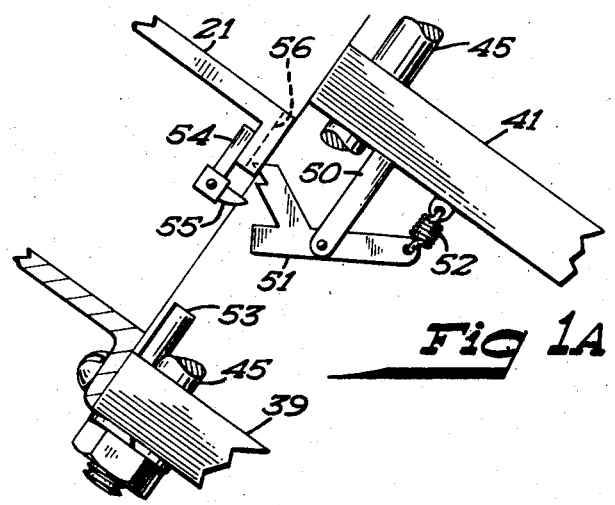
FIG. 1A is a side view of a portion of FIG. 1 during operation of the crusher.
Figure 6:
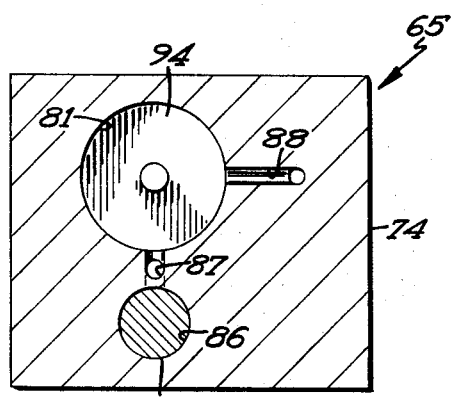
FIGS. 6–10 are cross-sectional views of the valve of FIG. 3 taken along the respectively numbered lines.
Figure 7:
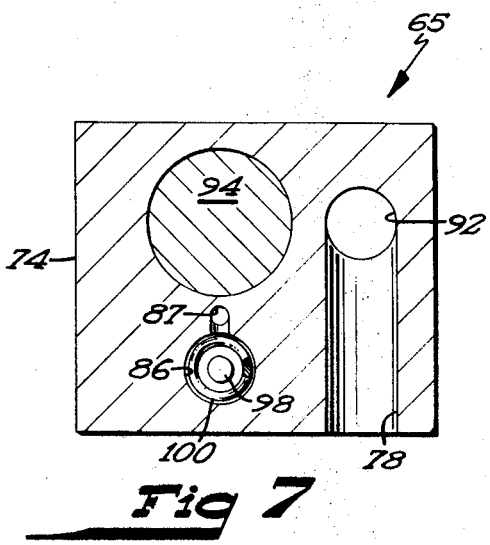
Figure 8:
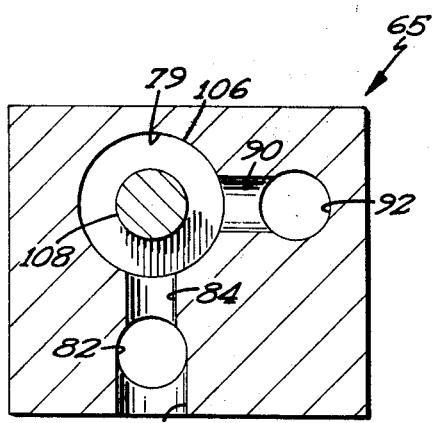
Figure 9:
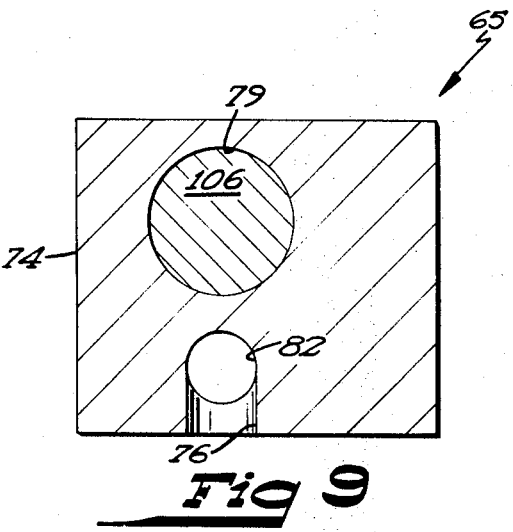
Figure 10:
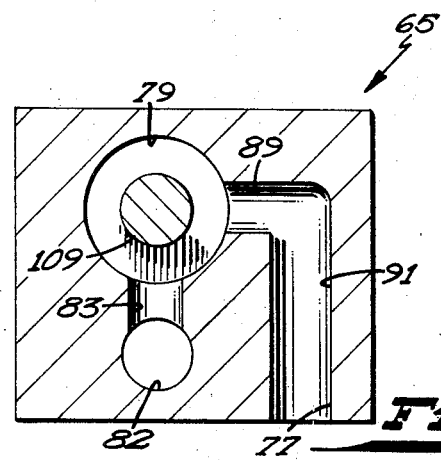

As platen 41 moves upwardly, latch member 51 lifts off of stop member 53. Bias spring 52 then contracts rotating latch member 51 in a counterclockwise direction so that its upper leading edge extends outwardly toward latch catch 55. With continued upward movement, latch member 51 engages catch member 55 from the lower side and rotates member 55 upwardly until latch member 51 slides past catch member 55. Catch member 55 drops back to its original position, and latch member 51 continues to move upwardly with platen 41 passing through groove 56 in the depending end of elevator platform 21 as is shown in FIG. 1A.

When movable platen 41 return to its lower position, the outwardly extending end of latch member 51 temporarily engages the upper surface of catch member 55. The spring tension on bias spring 52 is great enough to maintain pressure on catch 55 and elevator platform 21 until ball 29 disengages from depression 25, whereupon elevator platform 21 drops back to its lower position 33 so that it is reset to feed in the next article to be crushed. As movable platen 41 approaches the bottom of its travel, latch member 51 again engages stop member 53 and is rotated in a clockwise direction to the position with the leading edge out of the line of travel of catch member 55.

VALVE STRUCTURE—FIGS. 2–10

Hydraulic valve 65, which controls the operation of crusher 15, also includes a novel structure which is shown in FIGS. 2 through 10. A valve body 74 contains a pressure inlet port 75, a ram supply and return port 76, a ram drain port 77 and a pressure drain port 78, which are best shown in FIG. 5. The remainder of the valve structure can best been be referring to FIGS. 2–4 and 6–10. Valve body 74 also includes a first cavity 79 in which a spool 80 is disposed. Body 74 also contains a second cavity 81 and a passageway 82 which connects ports 75 and 76. A first interior port 83 connects one end of passageway 82 adjacent ram supply and return port 76 to spool cavity 79. A second interior port 84 connects a portion of passageway 82 adjacent pressure port 75 to spool cavity 79.

A first restricted passage 85 connects the opposite end of passage 82 to a valve chamber 86 within valve body 74, and a second restricted passage 87 connects valve chamber 86 with second cavity 81. The left end of passageway 82, restricted passage 85, valve chamber 86 and second restricted passage 87 provide a first fluid conducting path between pressure inlet port 75 and second cavity 81. A restricted drain passageway 88 connects the right end of second cavity 81 with pressure drain port 78. Restricted passageway 88 provides a second fluid conducting path in valve body 74. Further interior drain ports 89 and 90 connect portions of spool cavity 79 to a passage 91 and ram drain port 77 and to a passage 92 and supply drain port 78, respectively. Valve body 74 contains a vent hole 93 connecting one end of second cavity 81 with the outside atmosphere for equalizing pressure. Finally, a passageway 102 connects the adjacent ends of second cavity 81 and spool cavity 79.

A hydraulic spool actuating means is provided in second cavity 81 by a piston 94 which is connected to an actuating rod 95. The ends of actuating rod 95 remote from piston 94 extends through passageway 102. Disposed about piston 94 is an O-ring seal 96 to prevent hydraulic fluid from flowing into the portion of cavity 81 communicating with vent hole 93. A bias mechanism, here shown as bias spring 97, is disposed between 94 and the wall of cavity 81 adjacent cavity 79. Spring 97 yieldably biases piston 94 toward the opposite end of cavity 81.

Valve 65 also includes a hydraulic fluid pressure responsive mechanism which includes a valve closure member 98 disposed in valve chamber 86. Closure member 98 cooperates with a valve seat 99 formed in valve body 74 adjacent restricted passage 85. An adjustable bias means, here shown as a bias spring 100 and an adjusting screw 101 are provided to vary the pressure with which closure member 98 is forced against seat 99.

Spool 80 has a first land 105, a second land 106 and a third land 107 separated from one another by shank portions 108 and 109, respectively. Spool 80 further includes an exterior shank portion 110 and connecting means 111 which operatively connect shank portion 110 and spool 80 to solenoid 66. Disposed about lands 105, 106 and 107 are O-rings 96 which prevent hydraulic fluid from leaking between ports or out of valve 65.

The hydraulic line connections to valve 65 are as follows: Pressure port 75 is connected to the pressure supply line 64, ram supply and return port 76 is connected to ram supply and return line 68, ram drain port 77 is connected to drain line 69 and pressure drain port 78 is connected to drain line 71.

VALVE OPERATION—FIGS. 2–10

When an article to be crushed enters crusher 15 and actuates switch 47, solenoid 66 moves spool 80 to the pressure position shown in FIG. 2. In this position, fluid under pressure entering through port 75 flows in passageway 82 to port 76, to interior ports 83 and 84, and to restricted passage 85. The pressure generated on spool 80 at ports 83 and 84 freezes spool 80 in that position even though energy is removed from solenoid 66. Hydraulic fluid flowing out of port 76 actuates hydraulic ram 43. At the same time, hydraulic pressure builds up in restricted passage 85 on closure member 98 which is preset to open at a specific hydraulic pressure, e.g. 500 p.s.i. Until that hydraulic pressure is reached, valve member 98 is firmly seated on seat 99 and no fluid flows through valve chamber 86.

As soon as the hydraulic pressure on closure member 98 reaches the predetermined value, closure member 98 cracks away from seat 99 and hydraulic fluid flows through chamber 86 and restricted passage 87 to the end of second cavity 81 remote from cavity 79. The pressure of fluid in cavity 81 forces piston 94 toward cavity 79 against the bias of spring 97. As piston 94 moves toward cavity 79, air is expelled from the portion of cavity 81 adjacent cavity 79 through vent hole 93. Actuating rod 95 moves through passage 102 and bears against the adjacent end of spool 80.

Motion of piston 94 toward cavity 79 causes spool 80 to be moved to the drain position shown in FIG. 3. Restricted passages 87 and 88 are designed so that fluid pressure builds up in cavity 81 as long as closure member 98 is off of seat 99. As soon as spool 80 moves to the position shown in FIG. 3, hydraulic supply pressure is removed from hydraulic ram 43 because interior port 84 communicates with interior port 90 through the portion of cavity 79 about shank portion 108 thereby allowing fluid under supply pressure to flow to drain port 78 without substantial resistance. At the same time, interior port 83 communicates with interior port 89 through the portion of cavity 79 about shank portion 109 thereby allowing fluid from cylinder 42 to flow to drain port 77 without substantial resistance. These interior communications provide two separate drain circuits for hydraulic fluid.

When valve 65 is in the drain position, pressure is removed from ram 43, return spring 44 and ram 43 exert sufficient pressure on the fluid in cylinder 42 to force it back through pipe 68 and port 76 into valve 65. The hydraulic fluid flowing from port 76 continues upward through port 83, cavity 79, port 89, passage 91, drain port 77 and drain line 69 to reservoir 61. Fluid from pump 60 enters port 75 and flows through port 84, cavity 79, port 90, passageway 92, port 78 and drain line 71 to reservoir 61. As soon as valve 65 is in the drain position, fluid pressure valve member 98 drops and member 98 immediately reseats itself on seat 99. Fluid pressure in cavity 81 also drops, and bias spring 97 forces piston 94 away from cavity 79 expelling the fluid from cavity 81 through restricted passage 88 and drain port 78.

Fluid is expelled from cavity 81 until piston 94 reaches the end of its travel as shown in FIG. 4 leaving valve 65 in the standby position. In that position, valve 65 is ready to receive another actuating signal from solenoid 66 which will move spool 80 to the pressure position shown in FIG. 2 again.

It can be seen that modifications can be made to the apparatus without departing from the contemplated scope of the invention. For example, normally open and normally closed switches and valves can be replaced by their reverse counterparts with suitable circuitry and bias reversals. Also, a suitable valving arrangement can be substituted for the simple restricted passage 88 to control expulsion of fluid from cavity 81 when fluid pressure is removed therefrom. Other modifications will be apparent to those skilled in the art.

VALVE STRUCTURE AND OPERATION—FIGS. 11–16

A modified hydraulic valve is shown in FIGS. 11 through 16. This valve can be substituted for that shown in FIGS. 2 through 10 in the apparatus of the invention and is the presently preferred structure. The valve of FIGS. 11 through 16 is constructed and operates in a manner similar to that of the valve of FIGS. 2 through 10 with certain exceptions which are pointed out hereafter. Parts of the valve of FIGS. 11 through 16 which correspond to those of the valve of FIGS. 2 through 10 are numbered with corresponding numbers 100 greater than the numbers on the valve of FIGS. 2 through 10.

An L-shaped passage 220 connects one end of valve chamber 186 to second cavity 181 and to a metered orifice 221 which communicates with restricted drain passageway 188. L-shaped passageway 220 and metered orifice 221 provide the fluid path between chamber 186, cavity 181, and passageway 188.

Figure 11:
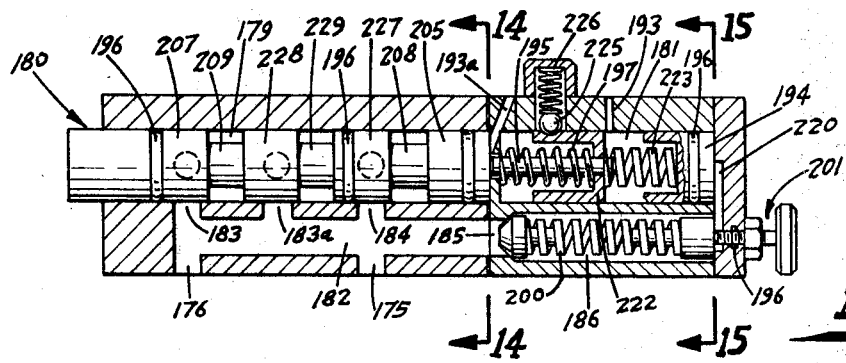
FIG. 11 is a cross-sectional view of a modified valve for use in the apparatus, the valve being in a pressure position.
Figure 12:
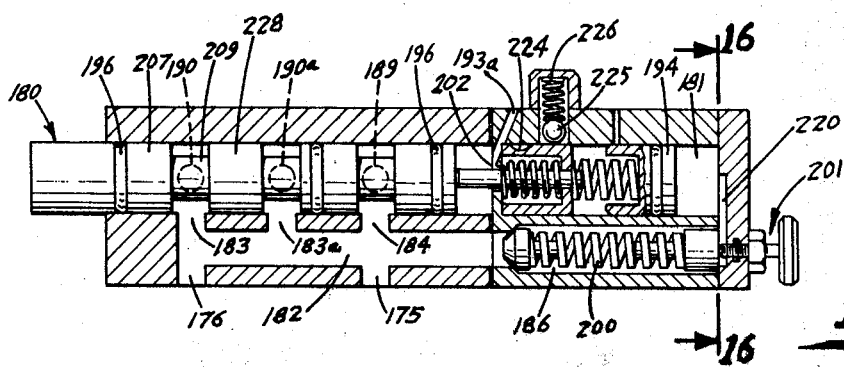
FIG. 12 is a cross-sectional side view of the valve of FIG. 11 in a drain position.
Figure 13:
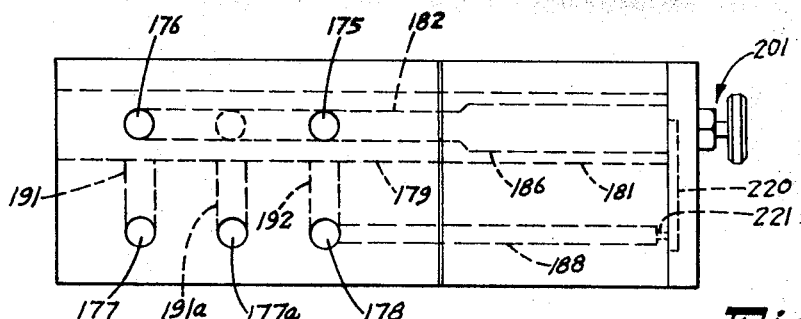
FIG. 13 is a bottom view of the valve of FIG. 11.
Figure 14:
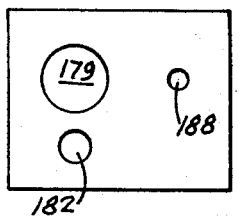
FIGS. 14–16 are cross-sectional views of the valve body of FIGS. 11 and 12 taken along the respectively numbered lines with the spool and other internal parts removed.
Figure 15:
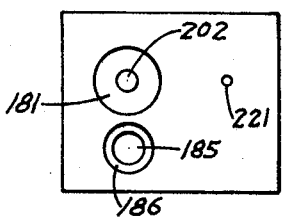
Figure 16:
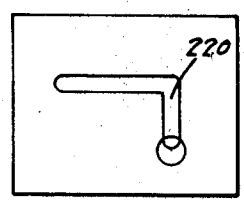

The means for actuating spool 180 to its second position is a double-acting piston arrangement which provides snap actuation. Piston 194, which responds to the fluid pressure transmitted into second cavity 181, acts on a second piston 222 through a bias spring 223. Second piston 222 is attached to actuating rod 195 and is biased to the right, as shown in FIG. 11, by bias spring 197. Second piston 222 is held in the position shown in FIG. 11 by a detent mechanism, here shown as a hemispherical depression 224 in the wall of piston 222 into which a ball 225 is forced by a bias spring 226. The detent mechanism retains piston 222 in the position shown in FIG. 11 until piston 194 is driven to the left by fluid pressure to release the detent mechanism either by pressure of spring 223 or by actual contact btween pistons 222 and 194. The pressure of spring 223 then forces piston 222 to the left rapidly and forcefully until it reaches the position shown in FIG. 12. This rapid forceful action causes positive snap actuation of spool 180 to the drain position shown in FIG. 12. The snap action of the valve of FIGS. 11 through 16 eliminates difficulties which are sometimes encountered because of the pressure seal holding spool 180 in its first position. A further structural modification necessitated by the double-acting piston is an additional vent hole 193a communicating with the portion of second cavity 181 to the left of second piston 222.

A second drain passageway is provided to assist in draining fluid from hydraulic ram 43 when the valve is in the drain position. A second interior drain port 190a is connected to a second ram drain port 177a by an interior passage 191a. Ram drain port 177a is connected to fluid reservoir 61 by a second drain line, not shown. Addition of the second drain port requires an additional shank portion 229 and land surfaces 227 and 228 on spool 180. In all respects, other than those described above, the valve of FIGS. 11 through 16 is constructed and operates in the same manner as the valve of FIGS. 2 through 10.

What is claimed is:
1. A fully automatic article crushing apparatus comprising:
   article crushing means;
   article feeding means operable to feed articles, one at a time, to the crushing means;
   first control means, responsive to the presence of an article to be crushed in the feeding means, connected in controlling relation to the feeding means for causing the feeding means to feed the article into the crushing means; and
   second control means having actuator means sensing the presence of the article to be crushed in the crushing means, said second control means connected in controlling relation to the crushing means for causing the crushing means to crush the article when the actuator means senses the presence of the article in the crushing means.

2. An article crushing apparatus according to claim 1 which further includes:
   reset means operatively connected to the crushing means for resetting the crushing means to crush another article immediately after crushing a previous article; and further reset means operatively connected between the crushing means and the feeding means for resetting the feeding means to feed another article into the crushing means.

3. An article crushing apparatus according to claim 2 wherein:
   the feeding means is electrically actuated,
   the crushing means is hydraulically actuated,
   the reset means is mechanical, and
   the further reset means is mechanical.

4. An article crushing apparatus according to claim 2 wherein
   the feeding means includes an elevator platform movable between first and second positions and operatively connected to a first solenoid actuator, the platform having an opening therethrough; and the first control means includes a first pressure responsive switch positioned adjacent the platform and extending upwardly through the platform opening when the platform is in the first position, electrical circuit means connecting the first switch for moving the platform from the first to the second position upon actuation of the first switch in controlling relation to the first solenoid and adapted to connect the first switch and the first solenoid to a source of power, and detent means cooperable with the actuator to maintain the platform in the second position until the further reset means returns the platform to the first position.

5. An article crushing apparatus according to claim 3 wherein
   the further reset means includes a latch bracket rigidly attached to the crushing means, a latch rotatably attached to the latch bracket, bias means yieldably biasing the latch in a first position, a stop member positioned adjacent the crushing means and cooperable with the latch to cause the latch to be rotated to a second position against the force of the bias means when the reset means resets the crushing means, a latch catch bracket rigidly attached to the elevator platform, and a rotatable latch catch biased in a first position and temporarily rotatable to a second position by contact with the latch during crushing of an article by the crushing means, the latch and latch catch being positioned so that no contact is made between them during movement of the elevator platform from the first position to the second position, so that the latch temporarily engages the latch catch temporarily moving it to the second position to allow the latch to pass by the latch catch during operation of the crushing means, and so that the latch engages the latch catch during resetting of the crushing means thereby disengaging the detent means and returning the elevator platform to its first position.

6. An article crushing apparatus according to claim 2 wherein
   the crushing means includes a stationary platen, a movable platen movable toward the stationary platen by application of hydraulic power, and a hydraulic ram operatively connected to the movable platen;

the second control means includes a second pressure responsive switch positioned adjacent one of the platens, a hydraulic fluid supply under pressure, a fluid reservoir, a hydraulic valve connected to the hydraulic supply, the fluid reservoir and the hydraulic ram to control the application of the hydraulic fluid under pressure to the hydraulic ram, a second solenoid connected to control the hydraulic valve, and electrical circuit means connecting the second switch in controlling relation to the second solenoid and adapted to connect the second switch and the second solenoid to a source of power; and the reset means includes a stationary backup plate positioned adjacent the hydraulic ram on the side of the movable platen opposite that nearest the stationary platen and spring means connecting the backup plate to the movable platen.

7. The article crushing apparatus according to claim 1 wherein: the feeding means includes an elevator platform movable between a first position to receive an article and a second position to discharge an article into the crushing means and means to move the elevator platform between the first position and the second position.

8. The article crushing apparatus according to claim 1 wherein: the crushing means includes a first stationary platen, a second platen movable relative to the stationary platen, and a hydraulic ram operatively connected to the second platen, said second control means including a pressure responsive switch positioned adjacent one of the platens, a hydraulic valve for connecting a hydraulic fluid under pressure to the hydraulic ram to control the application of hydraulic fluid to the ram, a solenoid connected to the hydraulic valve, an electrical circuit means connecting the switch in controlling relation with the solenoid and adapted to connect the switch and the solenoid to a source of power whereby on actuation of the switch in response to an article in the crushing means hydraulic fluid under pressure is supplied to the hydraulic ram to move the first and second platens relative to each other to crush the article.

9. An article crushing apparatus comprising:

article crushing means including a stationary platten, a movable platen movable toward the stationary platen by application of hydraulic power, a hydraulic ram operatively connected to the movable platen, an article feeding means adapted to feed articles, one at a time, to the crushing means, first control means, responsive to the presence of an article to be crushed in the feeding means, connected in controlling relation to the feeding means for causing the feeding means to feed the article into the crushing means, second control means, responsive to the presence of the article to be crushed in the crushing means, connected in controlling relation to the crushing means for causing the crushing means to crush the article, said second control means including a second pressure responsive switch positioned adjacent one of the platens, a hydraulic fluid supply under pressure, a fluid reservoir, a hydraulic valve connected to the hydraulic supply, the fluid reservoir and the hydraulic ram to control the application of the hydraulic fluid under pressure to the hydraulic ram, a second solenoid connected to control the hydraulic valve, and electrical circuit means connecting the second switch in controlled relation to the second solenoid and adapted to connect the second switch and the second solenoid to a source of power; said hydraulic valve including a valve body having a plurality of ports including an inlet port, a load port and at least one drain port communicating with a first interior cavity, the body further having a second cavity a first fluid conducting path connecting the inlet port and the load port, the load port and inlet port communicating with the at least one drain port only through the first cavity, the inlet port being connected to the hydraulic fluid supply, the load port being connected to the hydraulic ram, and the at least one drain port being connected to the fluid reservoir;

a spool disposed in the first cavity and movable between first and second positions therein, said spool being constructed to block communication between the inlet and load ports and the at least one drain port in the first position and to allow communication therebetween in the second position;

pressure responsive valving means disposed in the first path between the inlet port and the second cavity and biased in a first position until a predetermined fluid pressure within the first path is exceeded, the valving means being movable to a second position by the fluid pressure when the predetermined pressure is exceeded thereby causing a change in fluid pressure in the second cavity;

connecting means operatively connecting the spool to the second solenoid so that actuation of the second solenoid moves the spool to its first position wherein fluid under pressure can flow through the valve from the inlet port to only the load port whereupon fluid pressure increases at the pressure responsive valving means; and hydraulically actuated means for moving the spool to its second position wherein fluid under pressure can flow from the inlet port and the load port to the at least one drain port without significant fluid pressure increases in said first path, the hydraulically actuated means being disposed in the second cavity, maintained in a first position while the pressure responsive valving means is in its first position, and movable to a second position in response to a fluid pressure change in the second cavity resulting from movement of the pressure responsive valving means to its second position, the hydraulically actuated means being positioned so that it moves the spool to its second position upon movement of the hydraulically actuated means to its second position;

reset means operatively connected to the crushing means for resetting the crushing means to crush another article immediately after crushing a previous article, said reset means including a stationary back-up plate positioned adjacent the hydraulic ram on the side of the movable platen opposite that nearest the stationary platen and spring means connecting the backup plate to the movable platen; and further reset means operatively connected between the crushing means and the feeding means for resetting the feeding means to feed another article into the crushing means.

10. An article crushing apparatus according to claim 9 wherein: the feeding means includes an elevator platform movable between a first position and a second position, said platform being operatively connected to a first solenoid actuator, said first control means having a first pressure responsive switch positioned adjacent the platform, said switch having an actuator located above the platform when the platform is in the first position, electrical circuit means connecting the first switch for moving the platform from the first position to the second position upon actuation of the first switch in controlling relation to the first solenoid, said circuit means adapted to connect the first switch and the first solenoid to a source of electric power, and means cooperable with the platform to maintain the platform in the second position until the further reset mean returns the platform to the first position.

11. A fully automatic article crushing apparatus comprising:

article crushing means;

article feeding means adapted to feed articles, one at a time, to the crushing means;

first control means, responsive to the presence of an article to be crushed in the feeding means, connected in controlling relation to the feeding means for causing the feeding means to feed the article into the crushing means; and second control means, responsive to the presence of the article to be crushed in the crushing means, connected in controlling relation to the crushing means for causing the crushing means to crush the article, the second control means including a valve, said valve comprising a valve body having a plurality of ports including an inlet port communicating with a first interior cavity, the body further having a second cavity and a first fluid conducting path connecting the inlet port and the second cavity;

a spool disposed in the first cavity and movable between first and second positions therein;

pressure responsive valving means disposed in the first path between the inlet port and the second cavity and biased in a first position until a predetermined fluid pressure within the path is exceeded, the valving means being movable to a second position by fluid pressure when the predetermined pressure is exceeded thereby causing a change in fluid pressure in the second cavity;

spool actuating means for moving the spool to its first position wherein fluid under pressure can flow through the valve from the inlet port in such a manner that fluid pressure increases at the pressure responsive valving means;

further spool actuating means for moving the spool to its second position wherein fluid under pressure can flow through the valve without significant fluid pressure increases in the first path, the further spool actuating means being disposed in the second cavity, maintained in a first position while the pressure responsive valving means is in its first position, and movable to a second position in response to a fluid pressure change in the second cavity resulting from movement of the pressure responsive valving means to its second position, the further actuating means being positioned so that it moves the spool to its second position upon movement of the further actuating means to its second position, said valve having one of the ports, other than the inlet port, operatively connected to the crushing means, the inlet port adapted to be connected to a source of fluid under pressure, at least one other port adapted to be connected to a fluid reservoir, the valve having at least part of the spool actuating means positioned adjacent the crushing means for actuating the spool in response to the presence of an article to be crushed.

12. The article crushing apparatus according to claim 11 wherein the plurality of ports includes at least one drain port; and which further comprises;

fluid pressure relief means connecting the second cavity to the drain port for relieving fluid pressure in the second cavity when the pressure responsive valving means is in the first position.

13. The article crushing apparatus according to claim 11 wherein the plurality of ports further includes a load port, a first drain port, and a second drain port;

the first path has a predetermined minimum diameter and communicates with a first portion of the second cavity, adjacent one end thereof;

the pressure responsive valving means including a valve seat formed by a portion of the wall of the first path, a valve closure member which, in the first position, cooperates with the seat to form a fluid tight seal, and which, in the second position has moved away from the seat thereby allowing fluid pressure in excess of the predetermined pressure to be transmitted to the second cavity, and adjustable biasing means cooperable with the closure member to yieldably bias the closure member in the first position;

the valve body further includes a passageway directly connecting one end of the first cavity to the opposite end of the second cavity and a second fluid conducting path connecting the first portion of the second cavity to the second drain port, the second path having a maximum diameter less than the minimum diameter of the first path; and the further spool actuating means including piston means slidably positioned in the second cavity in fluid tight engagement with the walls thereof between the first portion and the opposite end, including a member operably connected to the piston means, slidably disposed in the passageway, and adapted to cooperate with the spool to move it to its second position when fluid pressure in excess of the predetermined pressure is transmitted to the first portion of the second cavity thereby moving the piston means toward the opposite end; and which further comprises:

yieldable bias means disposed in the second cavity between the piston means and the opposite end for moving the piston means away from the opposite end upon return of the closure member to the first position.

14. The article crushing apparatus according to claim 13 wherein the spool includes an extension projecting through and outwardly from the valve body; and the spool actuating means includes a solenoid mounted coaxially with the extension and cooperable there with to move the spool to its first position upon application of electrical energy to the solenoid, the solenoid being adapted for connection to a source of electrical energy.

References Cited

UNITED STATES PATENTS

| | | | |
|---|---|---|---|
| 2,558,255 | 6/1951 | Johnson et al. | 241—99 |
| 2,619,150 | 11/1952 | Smith | 241—99 |
| 2,800,159 | 7/1957 | Walsh et al. | 241—99 |
| 2,907,530 | 10/1959 | Pyles | 241—34 |
| 2,965,316 | 12/1960 | Henderson et al. | 241—34 |

GERALD A. DOST, Primary Examiner

U.S. Cl. X.R.

91—418; 100—215, 269; 241—36, 99